Oct. 13, 1953 D. F. PRZYBYLSKI 2,655,269
BUCKET CARRYING TURN POST FOR DIGGERS
Filed Feb. 26, 1951 2 Sheets-Sheet 1
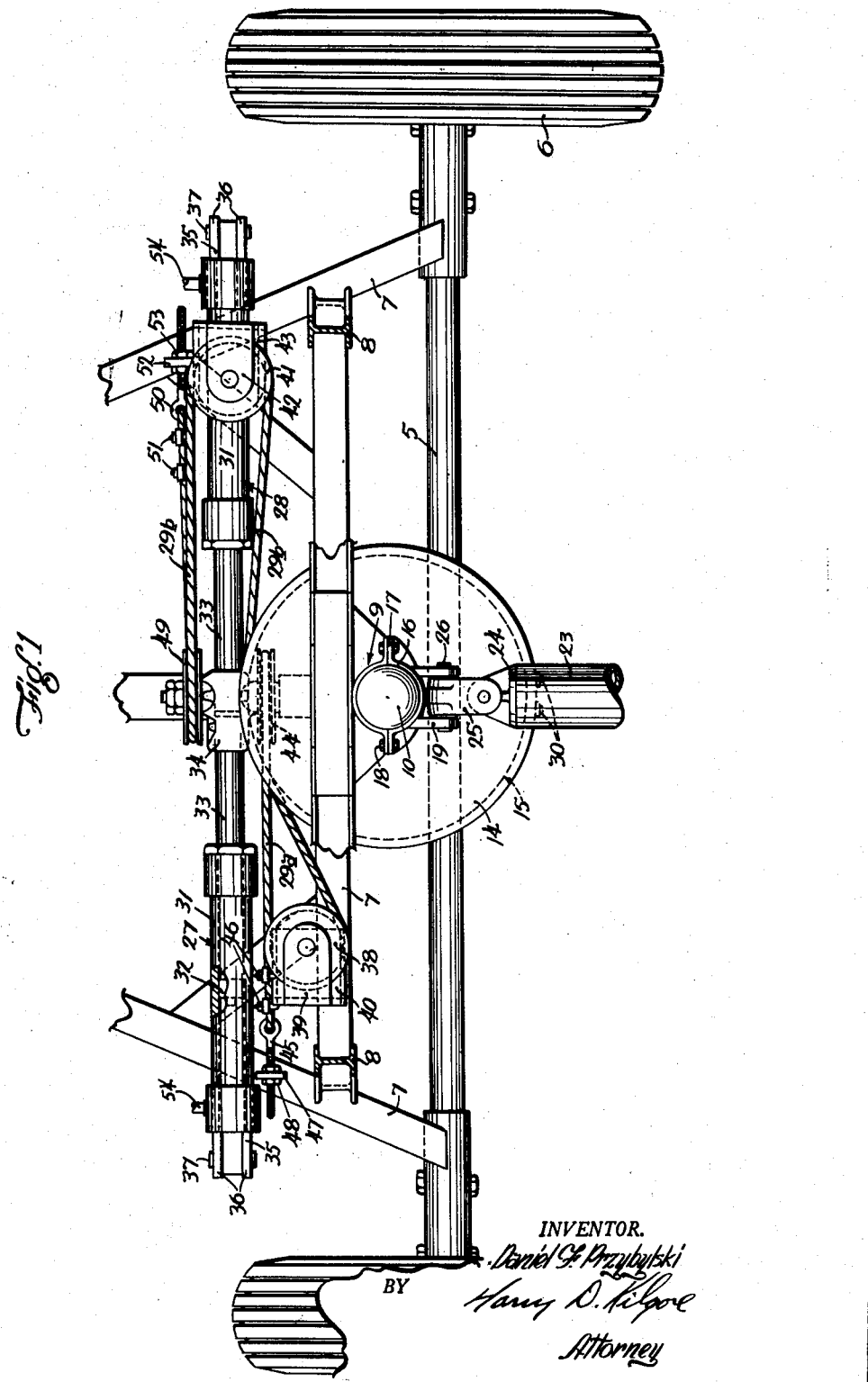
INVENTOR.
Daniel F. Przybylski
BY Harry D. Kilgore
Attorney Oct. 13, 1953     D. F. PRZYBYLSKI     2,655,269
BUCKET CARRYING TURN POST FOR DIGGERS
Filed Feb. 26, 1951     2 Sheets-Sheet 2
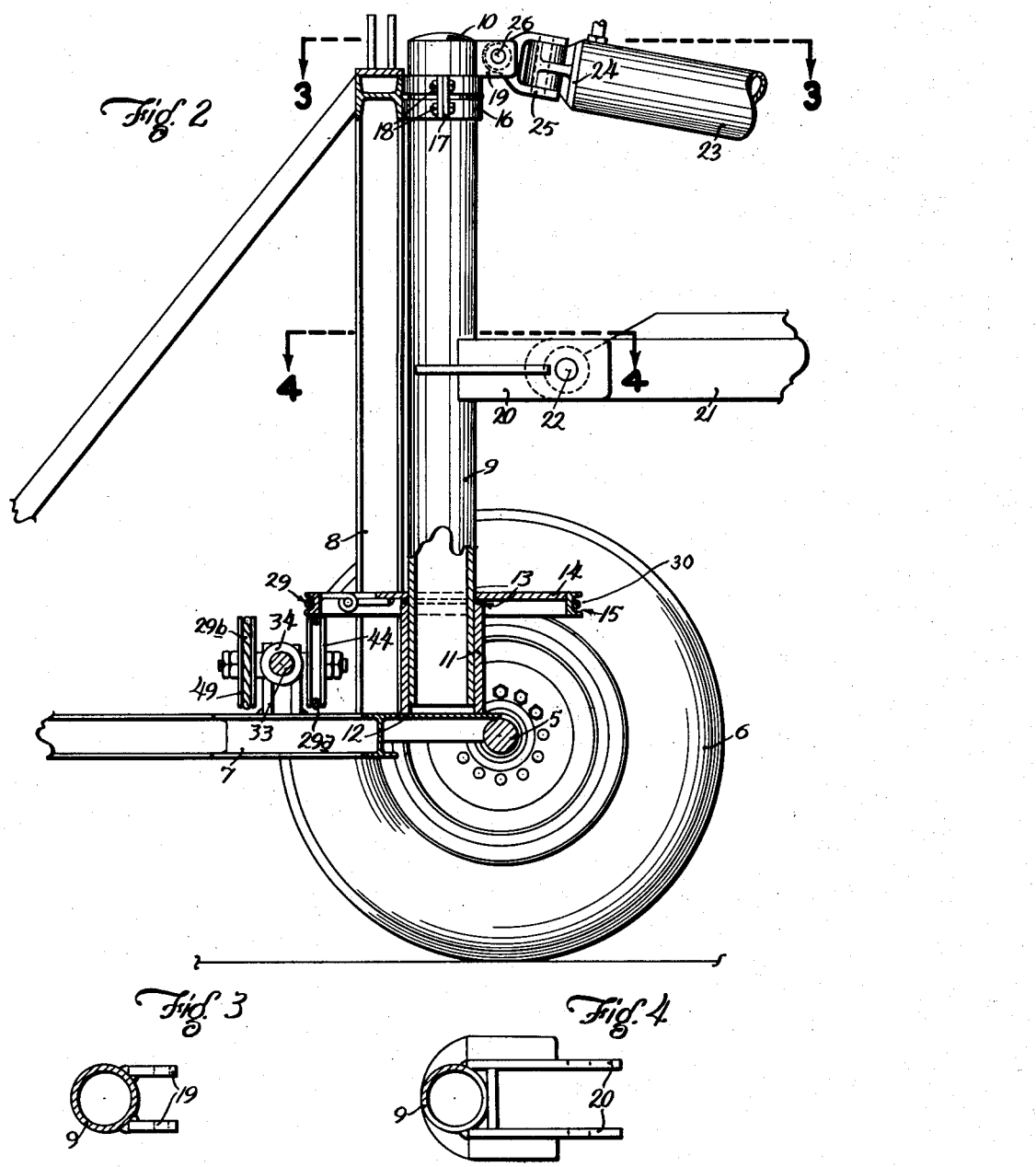
INVENTOR.
Daniel F. Przybylski
BY Harry D. Kilgore
Attorney Patented Oct. 13, 1953

2,655,269

UNITED STATES PATENT OFFICE 2,655,269

BUCKET CARRYING TURN POST FOR DIGGERS

Daniel F. Przybylski, Winona, Minn.

Application February 26, 1951, Serial No. 212,774

1 Claim. (Cl. 212—66)

My present invention relates to improvements in diggers of the bucket and trailer type.

More specifically, this invention is for a novel turn post for carrying a bucket and its operating assembly, and for novel means for turning the turn post.

To the above end, generally stated, the invention consists of the novel devices and combination of devices hereinafter described and defined in the claim.

In the accompanying drawings which illustrate the invention, like characters indicate like parts throughout the several views.

Referring to the drawings:

Fig. 1 is a fragmentary plan view of the invention with some parts shown in section;

Fig. 2 is a fragmentary view partly in side elevation and partly in longitudinal central section; and Figs. 3 and 4 are detail views partly in plan and partly in section taken on the lines 3—3 and 4—4 of Fig. 2, respectively.

The invention as shown is mounted on a two-wheeled trailer fully shown, described and broadly claimed in my copending application filed February 26, 1951, under Serial No. 212,772 and entitled "Trailer Type Digger." Of the parts of the trailer shown, it is important to note the axle extension 5; the right-hand wheel 6, the sub-frame 7, and the upright frame 8.

The numeral 9 indicates a turn post, as shown, a pipe, the upper end of which is closed by a cap 10. This turn post 9 is turnably mounted at its lower end portion in a tubular step bearing 11 rigidly secured at its lower end to a base 12 between the axle extension 5 and the sub-frame 7 and rigidly secured thereto. On the upper end of the step bearing 11 is a bronze extension thereof 13. A large pulley 14 having a grooved periphery 15 is secured on the turn post 9, rests on the bearing extension 13, and turnably supports the turn post 9 with its lower end out of engagement with the base 12 for free turning movement. The turn post 9 at its upper end portion is turnably mounted in a bearing 16 in the form of a collar. One section of the bearing 16 is rigidly secured to the upper frame 8 at its upper end. Both sections of the bearing 16 have outturned flanges 17 detachably connected by nut-equipped bolts 18.

Fixed on the turn post 9 is an upper pair of laterally spaced ears 19 and a lower pair of laterally spaced ears 20. These pairs of ears 19 and 20 project outwardly from the turn post 9 in the same vertical plane. The ears 19 are above the bearing 16 and the ears 20 are midway between said bearing and the pulley 14.

A fragment of the rear end portion of a boom 21 that carries a bucket, not shown, extends between the ears 20, the lower pair, and is attached thereto by a pivot pin 22 for swinging movement in a vertical plane. A fragment of the inner end portion of an upper ram 23 provided for imparting partial movement to the bucket, has on its inner end portion a head 24. This head 24 is attached to the upper pair of ears 19 by a universal joint 25 that extends between said ears and is attached thereto by a pivot pin 26. The boom 21 and the ram 23 are part of a bucket assembly fully shown and described in a copending application filed February 26, 1951, under Serial No. 212,773.

The turn post 9 is turned to swing the bucket by a pair of reversely acting hydraulic rams 27 and 28 and a cable 29.

The cable 29 is secured in the groove 15 of the pulley 14 at its intermediate portion by a pair of clamps 30. When the turn post 9 is positioned with the boom 21 longitudinally aligned with the longitudinal center of the trailer, the clamps 30 are at the outermost portion of the pulley 14, see Fig. 2.

The rams 27 and 28 are axially aligned and extend transversely of the sub-frame 7. Each ram 27 and 28 includes a cylinder 31 and a piston 32 having a piston rod 33. These rams 27 and 28 are positioned with their piston rods 33 extending inwardly and said piston rods are connected by a coupling 34. Each cylinder 31 has on its outer end a head 35 that extends between a pair of ears 36 and is attached thereto by a pivot pin 37. The pairs of ears 36 extend upwardly and outwardly of the sub-frame 7 to which they are rigidly secured.

The end sections of the cable 29, 29ᵃ and 29ᵇ extend in opposite directions, each substantially half-way around the pulley 14 where they cross each other and extend in opposite directions outwardly and transversely of the sub-frame 7. The cable section 29ᵃ passes around a directional sheave 38 journaled in a bearing bracket 39 rigidly secured to a pair of upstanding laterally spaced plates 40 rigidly secured on the sub-frame 7 on the left-hand side thereof. The cable section 29ᵇ passes around a directional pulley 41 journaled in a bearing bracket 42 rigidly secured to a pair of upstanding laterally spaced plates 43 which in turn are rigidly secured to the sub-frame 7 on the right-hand side thereof.

The cable sections 29ᵃ and 29ᵇ from the directional sheaves 38 and 41, extend inwardly in forwardly converging relation. Said cable section 29ª from the directional sheave 38 passes over a sheave 44 journaled on the coupling 34 at the back thereof and from thence said cable section extends outwardly to the left-hand side of the sub-frame 7 and is secured thereto by a long eye-bolt 45 by means of a pair of clamps 46. This eye-bolt 45 extends through a hole in an upstanding lug 47 on the sub-frame 7 and is adjustably secured thereto by a pair of nuts 48 that impinge opposite sides of said lug. The cable section 29ᵇ from the directional sheave 41, passes over a sheave 49 journaled on the coupling 34 at the front thereof and from thence said cable section extends outwardly to the right-hand side of the sub-frame 7 and has secured thereto a long eye-bolt 50 by means of a pair of clamps 51. This eye-bolt 50 extends through a hole in an upstanding lug 52 on the sub-frame 7 and is adjustably secured thereto by a pair of nuts 53 that impinge opposite sides of said lug. Obviously, by endwise adjustment of the eye-bolts 45 and 50, the cable sections 29ª and 29ᵇ may be held taut.

The pistons 32 are operated by a fluid under pressure that is discharged into each cylinder 31 through a fitting 54 back of its piston 32. As one of the pistons 32 is moved forwardly by the fluid forced into the respective cylinder 31 under pressure, it will project the coupling 34, and the sheaves 44 and 49 being moved away from said cylinder, will produce a pull on the cable sections 29ª and 29ᵇ passing over said sheaves and thus in turn impart turning movement to the turn post 9. At this same time, the other cable sections 29ª and 29ᵇ will be wound on the pulley 14.

The drawings illustrate a commercial form of the invention, but it will be understood that the same is capable of certain modifications as to details of construction, arrangement and combination of parts within the scope of the invention herein disclosed.

What I claim is:

The combination with a horizontally disposed frame and a large pulley mounted to turn about a vertical axis, of a pair of reversely acting axially aligned horizontally disposed hydraulic rams, each including a cylinder and a cooperating piston rod, the piston rods of the two rams being in opposing relation, a coupling connecting the piston rods at their outer ends, the cylinders being anchored at their outer ends to the frame, a cable wrapped around the pulley at its intermediate portion with its end portions extending in opposite directions longitudinally of the cylinders, a pair of directional sheaves jointed to turn about vertical axes, and anchored relative to the frame, one inwardly of the outer end of each cylinder, a second pair of directional sheaves, one on each side of the coupling and journaled thereto to turn about a horizontal axis, the end portions of the cables being arranged to run one over each of the first-noted directional sheaves and thence over one of the last-noted sheaves, the end portions of the cable outwardly of the last-noted sheaves extending in opposite directions substantially parallel to the rams and anchored to the frame.

DANIEL F. PRZYBYLSKI.

References Cited in the file of this patent

UNITED STATES PATENTS

| Number | Name | Date |
|---|---|---|
| 1,056,194 | Martineau | Mar. 18, 1913 |
| 2,322,151 | Matus | June 15, 1943 |
| 2,365,168 | Billings | Dec. 19, 1944 |
| 2,528,985 | Wunsch | Nov. 7, 1950 |
| 2,559,733 | Pitman | July 10, 1951 |